B. H. BENTON.
Surveying Instrument.
No. 2,880. Patented Dec. 12, 1842.
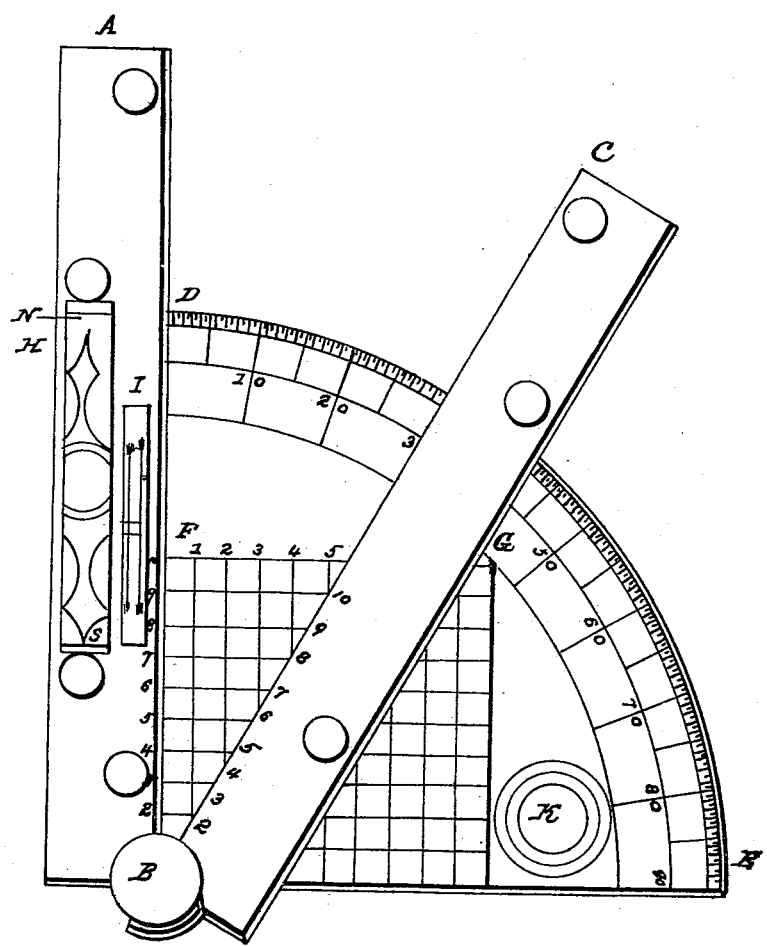

UNITED STATES PATENT OFFICE.

BENJAMIN H. BENTON, OF MIDDLEBURG, VIRGINIA.

IMPROVEMENT IN SURVEYING-INSTRUMENTS.

Specification forming part of Letters Patent No. 2,880, dated December 12, 1842.

*To all whom it may concern:*

Be it known that I, BENJAMIN HYDE BENTON, of the Lisbon Institution, in the county of Loudoun and State of Virginia, have made a new and useful Improvement in Surveying-Instruments; and I do declare that the following is a full and exact description of my improvement.

The instrument consists of a quadrant with a geometrical table and graduated arch and two limbs connected by a joint. One limb is firmly connected with the quadrant, while the other limb is joined to the center in such a manner as that it can move freely round over the quadrant and remain in any given situation, in which situation it can be secured by a screw underneath, which screw is attached to the said movable limb at such a distance from the center of motion as that it can move freely just under the arch of the quadrant. These limbs are both graduated or laid off in ten equal parts and marked 1, 2, 3, 4, &c., beginning at the center of motion. These parts are subdivided into tenths. Each limb is furnished with a pair of sights similar to those used in ordinary surveying - instruments, which sights are fastened down by screws. On the stationary limb there is a spirit-level and a box containing a magnetic needle. This box can be removed at pleasure and can be connected by means of screws to either limb.

The instrument when in use is placed on a staff by means of a ball and socket, which socket is attached to the instrument underneath the quadrant about equal distance from the center and the graduated arch.

The instrument is fully represented in the drawing, in which—

D E is the quadrant, and A B the stationary limb; B C, the movable limb or index, which moves over the face of the quadrant. To the limb the above-named screw is attached underneath the graduated edge of the quadrant, by which the limb is secured in any situation. The arch of the quadrant is divided into degrees and half-degrees, and on the face of the quadrant is the geometrical table marked 1, 2, 3, &c., on the line F G; also the limb A B and the index B C are graduated and marked 1, 2, 3, &c., beginning at the center of motion. These numbers, as well as those on the geometrical table, may be considered as units, tens, hundreds, &c. When they are considered as units, the subdivisions are taken as so many tenths of a unit. When they are taken as tens, the subdivisions are considered as units, &c.

With this instrument the difference of latitude and departure may be found without referring to the printed table.

Example: Suppose a line is to be run bearing north thirty degrees east, with the distance equal to 92.28 poles. The stationary limb is to be placed in the meridian and the index B C opened to thirty degrees, which is the direction of the line. While the instrument is in this position look on the index B C for the distance, 92.28 poles, and immediately opposite to this on the limb A B (which place can easily be found by following the lines of the geometrical table on the quadrant) is eighty poles, which is the difference of latitude for north thirty degrees east, 92.28 poles. The longitude is 46.14, found in like manner on the line F G.

The instrument can also be advantageously used in taking the altitudes of mountains, trees, and other objects.

Example: Required the height of a tree which is eighty feet distance from a given place. In this place erect the staff, on which suspend the instrument with the fixed limb horizontal to the plane of the horizon. Then look through the sights on the index B C to the top of the tree, which we will suppose to be thirty degrees, and while the instrument is in this position look on the horizontal limb for the distance, eighty feet. Immediately over this and on the index is the distance from the spectator's eye to the top of the tree; but on the table will be found on the line F G the height, 46.19 feet.

These and a variety of other examples might be given, all of which can be easily solved without the use of logarithms or any tables whatsoever. It can with equal convenience be used in taking the distances of inaccessible objects, &c.

The needle-box H is made of brass and is about five inches in length and one and one-half inch in breadth. On the plate of box at one end is engraved the letter "N" and at the other end the letter "S." A magnetic needle of the usual kind turns upon an iron point in the center of the box. A stop and trigger wire is applied to the box, in order to confine the needle when not in use. A glass covers the box to protect the needle.

The sights are about five inches long and fixed by screws perpendicular on each end of the limbs A B B C. Each sight contains a long slit or perforation, so that the observer may take his line of sight with the stationary limb on the index.

What I claim as my improvement, and desire to secure by Letters Patent, is—

Combining with a quadrant (or quadrant with a geometrical table) a movable limb or index graduated in the manner set forth, for the purpose specified.

BENJ. H. BENTON.

Witnesses:
JAS. H. BITZER,
PETER JETT.